Figures 1, 2:
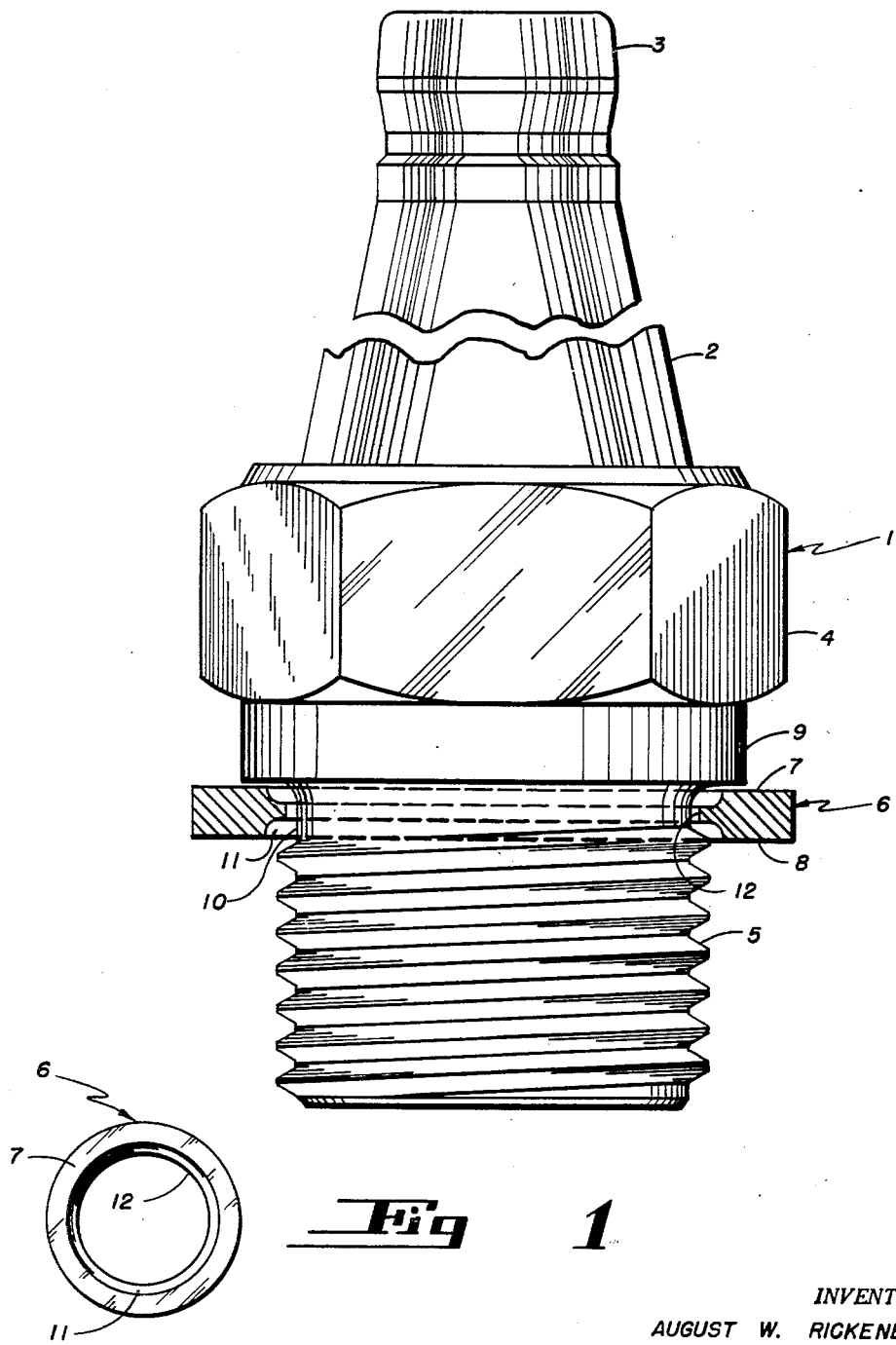

INVENTOR.
AUGUST W. RICKENBACH.
BY Alden D. Redfield
Warren Kunz.
ATTORNEYS.

United States Patent Office 2,941,105
Patented June 14, 1960

2,941,105
GASKET

August W. Rickenbach, Williamsport, Pa., assignor to Avco Manufacturing Corporation, Cincinnati, Ohio, a corporation of Delaware Filed Aug. 2, 1952, Ser. No. 302,357

3 Claims. (Cl. 313—118)

The present invention relates to a gasket and more particularly to a spark plug gasket for use with a spark plug for an internal combustion engine.

Because of the complexity of modern engine design, it is frequently necessary to install spark plugs in relatively inaccessible places where it is difficult to avoid dropping the gasket from the spark plug during the course of installation. As a result, on numerous occasions spark plugs have been installed either without a gasket, or with more than one gasket, or the gaskets have been dropped into the mechanism of the engine, frequently lodging in the cylinder cooling fins in the case of an air-cooled engine. Naturally, this is extremely undesirable and, although the gasket per se is a small item, it is very important that such gaskets be properly installed on spark plugs. Further, it is obviously undesirable to have gaskets wedged into the cooling fins of engines where they impede proper cooling and increase the possibility that loose gaskets will get into the working parts of the engine.

The present invention avoids the foregoing difficulties and makes it possible to install a spark plug with gasket in places that are difficult to reach. Because of the novel design of the gasket, spark plugs can be installed with assurance that the gasket is in place and that it will not drop off of the plug regardless of its position.

In view of the foregoing, it is an object of the present invention to provide an improved gasket for use on a spark plug or other threaded member. Another object of the present invention is to provide a gasket which can be easily and quickly installed on a threaded male member in anticipation of installation which can be accomplished without danger that the gasket will fall off the member.

A further object of the invention is the provision of a gasket which is simple in design and easily fabricated, and which is provided with means on its internal diameter for loosely engaging a threaded male member.

Another advantage of the invention is the provision of a gasket which can be removably positioned on a threaded member to facilitate installation of the member with the gasket, assuring, at the same time, that the gasket will not become separated from the member and will seat properly when the member is installed.

The novel features that are considered characteristic of the invention are set forth in the appended claims; the invention itself, both as to its organization and installation, together with additional objects and advantages thereof, will best be understood from the following description of a preferred embodiment when read in conjunction with the accompanying drawings, in which:

Figure 1 is an enlarged elevational view of a spark plug with a gasket of the preferred type positioned on the plug in anticipation of its installation in an engine, the gasket being shown in cross section to facilitate the description; and Figure 2 is a plan view of reduced size showing the gasket separated from the plug.

With reference to the attached figures, a spark plug, generally designated 1, has been illustrated, the plug including a conventional ceramic portion 2 having a terminal connection 3 at its upper end. The plug is conventional in its provision of a metallic base 4 including an integral threaded male portion 5 which is adapted to be threadedly secured in an engine (not shown).

A gasket of the preferred type is generally indicated at 6. The gasket includes two parallel annular seating faces 7 and 8, face 7 cooperating with a flat annular area 9 formed on base 4 while face 8 cooperates with the engine in which the plug is installed. It will be noted that an undercut 10 is provided above the threaded portion of the base, and that in this undercut there is positioned an annular projecting ridge 11 which is formed as an integral portion of the gasket. As will be obvious from the attached figures, ridge 11 is bounded in part by a cylindrical face 12 which is smaller in diameter than the major diameter of threaded portion 5.

As an illustration of the proportionality of the gasket, the following dimensions are listed as typical for an 18–1.5 mm. spark plug:

|  | Inches |
|---|---|
| Major diameter of plug threads | .7077–.7028 |
| Pitch diameter of plug threads | .6693–.6644 |
| Minor diameter of plug threads (max.) | .6246 |
| Inside diameter of gasket (cylindrical face 12) | .683–.677 |
| Diameter of gasket at base of ridge | .7210–.7150 |
| Outside diameter of gasket | .9700 |
| Thickness of gasket | .0850–.0770 |
| Thickness of ridge | .010–.015 |

From the foregoing dimensions, it will be apparent that the ridge engages the threads of the spark plug by a minimum amount of .0198 inch, and has a maximum engagement of .0207 inch on the diameter. This engagement is sufficient to guarantee that the gasket will not become disengaged from the plug after it is screwed onto the plug threads and up into the undercut 10. The ridge is thin enough to fit within the thread grooves. In other words, the gasket loosely engages the plug, being loose enough to assure sufficient movement for proper seating but not such excessive movement as to permit disengagement from the plug.

In practice, the gasket is installed on the plug as shown in Figure 1; the plug may then be handled and moved to any position necessary for its installation in an engine. Even when the plug is placed in a vertical position with its threaded end lowermost, the gasket will stay in place and the plug may be installed with complete assurance that the gasket will not drop from the plug and will properly seat on the plug and on the engine when the plug is fully installed. There is no danger of the gasket coming loose during installation, and there is no danger that the gasket will fall into the engine mechanism.

When the plug is removed from the engine, the gasket is again free and may be easily removed from the plug by being unscrewed from it in much the same fashion as a nut is unscrewed from a bolt.

In view of the foregoing, it will be obvious to those skilled in the art that a spark plug gasket of superior merit has been provided and one which will considerably facilitate installation of spark plugs in relatively inaccessible places.

Having described a preferred embodiment of my invention, I claim:

1. In combination with a spark plug having a base portion formed to define an annular seating area adjacent which is provided a threaded projecting end terminating in an undercut region adjacent the seating area, a gasket bounded by parallel plane seating areas, one of which cooperates with the seating face of the plug, and an annular inwardly projecting ridge substantially parallel to the seating areas of the gasket and projecting inwardly on the inside of the gasket, the ridge being bounded by an inner cylindrical surface having a diameter smaller than the major diameter of the spark plug threads but large enough to clear the base of the threads and thin enough to rotate freely in the thread grooves while said gasket is being installed or removed from the spark plug.

2. In combination with a spark plug having a threaded base portion and an undercut region adjacent the threads, a circular spark plug gasket bounded by parallel annular seating faces and on its outside diameter by a cylindrical surface, the gasket being provided on its internal periphery with a ridge terminating in a circle smaller than the major diameter of the spark plug threads but large enough to clear the base of the threads during installation of the gasket on the spark plug, said ridge being substantially parallel to the annular seating faces of the gasket and thin enough to rotate freely relative to the thread grooves.

3. In combination, a threaded member including a seating face and an undercut in the threads adjacent the seating face, a gasket removably engageable with the threaded member and having a seating face adjacent the seating face of said threaded member and having a ridge parallel with the seating face of the gasket projecting from the internal periphery of said gasket to an internal diameter smaller than the major diameter of the threads but large enough to clear the base of the threads and said ridge being thin enough to rotate freely relative to the thread grooves while said gasket is being installed or removed.

References Cited in the file of this patent

UNITED STATES PATENTS

| | | |
|---|---|---|
| 1,086,807 | Conrath | Feb. 10, 1914 |
| 2,041,136 | Klinger | May 19, 1936 |
| 2,325,024 | Andres | July 27, 1943 |
| 2,672,069 | Mitchell | Mar. 16, 1954 |

FOREIGN PATENTS

| | | |
|---|---|---|
| 596,311 | France | Aug. 8, 1925 |
| 198,232 | Switzerland | Sept. 1, 1938 |